US007475466B2

(12) United States Patent
Marume et al.

(10) Patent No.: US 7,475,466 B2
(45) Date of Patent: Jan. 13, 2009

(54) ALIGNMENT OF BODY AND FRAME OF VEHICLE

(75) Inventors: Yoshiaki Marume, Kokubunji (JP); Hiroaki Tanida, Fujisawa (JP); Makoto Umezawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 432 days.

(21) Appl. No.: 10/848,042

(22) Filed: May 19, 2004

(65) Prior Publication Data

US 2004/0205953 A1 Oct. 21, 2004

(51) Int. Cl.
*B23Q 3/00* (2006.01)

(52) U.S. Cl. ...................... 29/468; 29/281.5; 403/408.1

(58) Field of Classification Search .................. 29/712, 29/271, 283, 468, 464, 897.2, 281.1, 281.4, 29/281.5, 525.02, 525.11, 467; 403/408.1, 403/225, 203
See application file for complete search history.

(56) References Cited

U.S. PATENT DOCUMENTS 3,028,193 A * 4/1962 De Haan .................... 296/35.1
4,672,732 A * 6/1987 Ramspacher et al. .......... 29/429
4,928,386 A * 5/1990 Schupp et al. ................ 29/824
5,197,181 A * 3/1993 Abe et al. ..................... 29/596
5,778,517 A * 7/1998 Amesbichler et al. ......... 29/709
6,212,749 B1 * 4/2001 Chow et al. ................ 29/281.5
6,944,927 B2 * 9/2005 Nakamura ................. 29/407.1
2001/0013164 A1 * 8/2001 Morel et al. ............... 29/281.5

FOREIGN PATENT DOCUMENTS

JP 5-185952 A 7/1993

* cited by examiner

*Primary Examiner*—Jermie E Cozart
*Assistant Examiner*—Christopher M Koehler
(74) *Attorney, Agent, or Firm*—Foley & Lardner LLP

(57) ABSTRACT

A vehicle body (B) is lowered toward a frame (F) from above, and fixed to the frame (F) via a mount insulator (MI). Prior to fixing, a locating jig (1) is attached to the frame (F). A locating hole (E) is formed in the body (B). While lowering the body (B), the horizontal position of the body (B) is adjusted such that the locating jig (1) penetrates the locating hole (E). The body (B) is aligned accurately with the frame (F) when a predetermined state of engagement is reached between the locating jig (1) and locating hole (E). In this state, a fastening bolt (G) which is passed through the mount insulator (MI) is used to fix the body (B) to the frame (F), and thus the fastening bolt (G) can be tightened without applying an eccentric load on the mount insulator (MI).

7 Claims, 17 Drawing Sheets

ALIGNMENT OF BODY AND FRAME OF VEHICLE

FIELD OF THE INVENTION

This invention relates to position alignment required when fixing a vehicle body to a vehicle frame.

BACKGROUND OF THE INVENTION

Tokkai Hei 5-185952, published by the Japan Patent Office in 1993, discloses a mount insulator made of elastic material that is used when a body is fixed to a frame during the assembly of a vehicle comprising a frame.

In this prior art, the mount insulator is attached to one of the body and the frame and a fixing screw hole is formed in the other of the body and frame. A fastening bolt penetrates the mount insulator and is screwed into the fixing screw hole to fix the body to the frame.

Prior to fixing, a body conveyed from a vehicle body assembly line is lowered toward a frame that has been assembled on a frame manufacturing line. While lowering the body, the relative positions of the two components are adjusted such that a central hole in the mount insulator aligns with the fixing screw hole, prior to applying the fastening bolt.

In this position adjustment, first the central hole of the mount insulator and the fixing screw hole are aligned roughly, and then a guide pin passed through the central hole in the mount insulator is inserted into the fixing screw hole. Final alignment of the central hole and the fixing screw hole is then performed by wrenching the guide pin.

SUMMARY OF THE INVENTION

This type of alignment performed using a guide pin may result in a state in which only the opening portion of the central hole and the position of the fixing screw hole are aligned while the mount insulator is inclined When the fastening bolt is screwed into the fixing screw hole in this state, the incline of the mount insulator is corrected forcibly as the fastening bolt penetrates the fixing screw hole, and as a result, an eccentric load acts on the mount insulator. Fixing the body to the frame without releasing this eccentric load leads to an undesirable effect on the damping performance and durability of the mount insulator.

When an automatic loading mechanism, which performs alignment in the horizontal direction of the body automatically, is used, such problems do not arise. However, it is extremely expensive to introduce an automatic loading mechanism, and it is difficult to employ an automatic loading mechanism in small-scale production.

It is therefore an object of this invention to realize accurate position alignment of a vehicle body and frame without the use of large-scale mechanisms.

In order to achieve the above object, this invention provides a method of fixing a vehicle body having a locating hole to a vehicle frame. The method comprises fitting a locating jig which protrudes upward to the frame, lowering the body toward the frame from above, performing position alignment of the body and the frame in a horizontal direction by causing the locating jig to penetrate the locating hole, fixing the body to the frame upon completion of the position alignment, and removing the locating jig from the frame after fixing the body to the frame.

This invention also provides a locating jig for performing position alignment between a vehicle body and a vehicle frame before fixing the body to the frame while the body is lowered toward the frame from above. The body comprises a locating hole which opens downward. The locating jig comprises a main body portion which is removably fitted to the frame, and a locating portion which protrudes upward from the main body portion. The locating portion comprises a first diameter which is substantially identical to the diameter of the locating hole, and a second diameter which is smaller than the first diameter. The jig further comprises a mechanism which causes the diameter of the locating portion to expand from the first diameter to the second diameter while the locating portion is inserted in the locating hole.

The details as well as other features and advantages of this invention are set forth in the remainder of the specification and are shown in the accompanying drawings.

DESCRIPTION OF THE PREFERRED EMBODIMENTS

Figure 1:
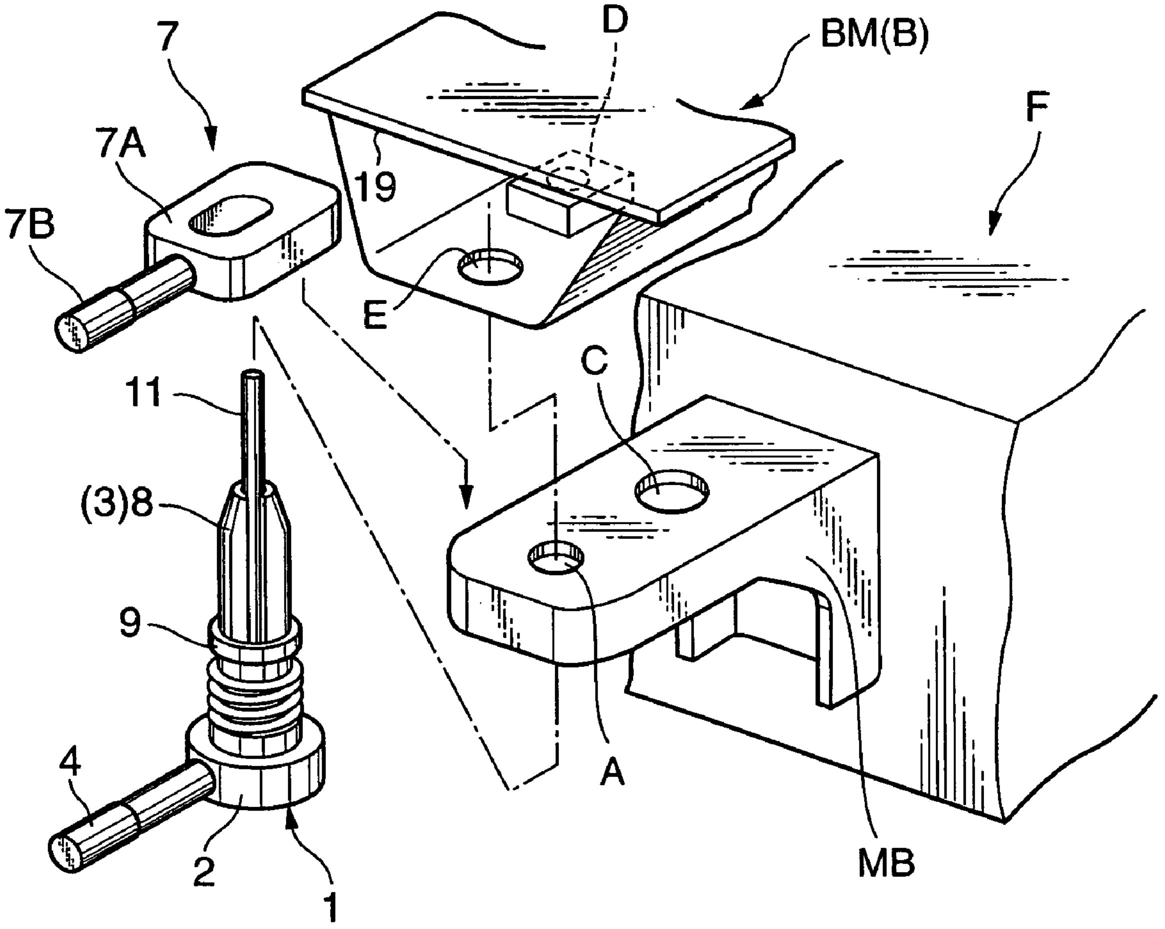
FIG. 1 is an exploded perspective view of a locating jig and a jig attachment portion of a vehicle according to this invention.

Referring to FIG. 1 of the drawings, in a first embodiment of this invention, a mount bracket MB formed on a frame F of a vehicle and a mounting portion BM forming a part of a body B are aligned using a locating jig 1.

A hole C and a hole A are formed at locations adjacent to each other in the mount bracket MB. Correspondingly, a fixing screw hole D and a locating hole E are formed in the mounting portion BM. The fixing screw hole D is a female screw that is threaded around its inner periphery. The mounting portion BM comprises a plate-form top plate 19 which covers the locating hole E from above.

Figure 2:
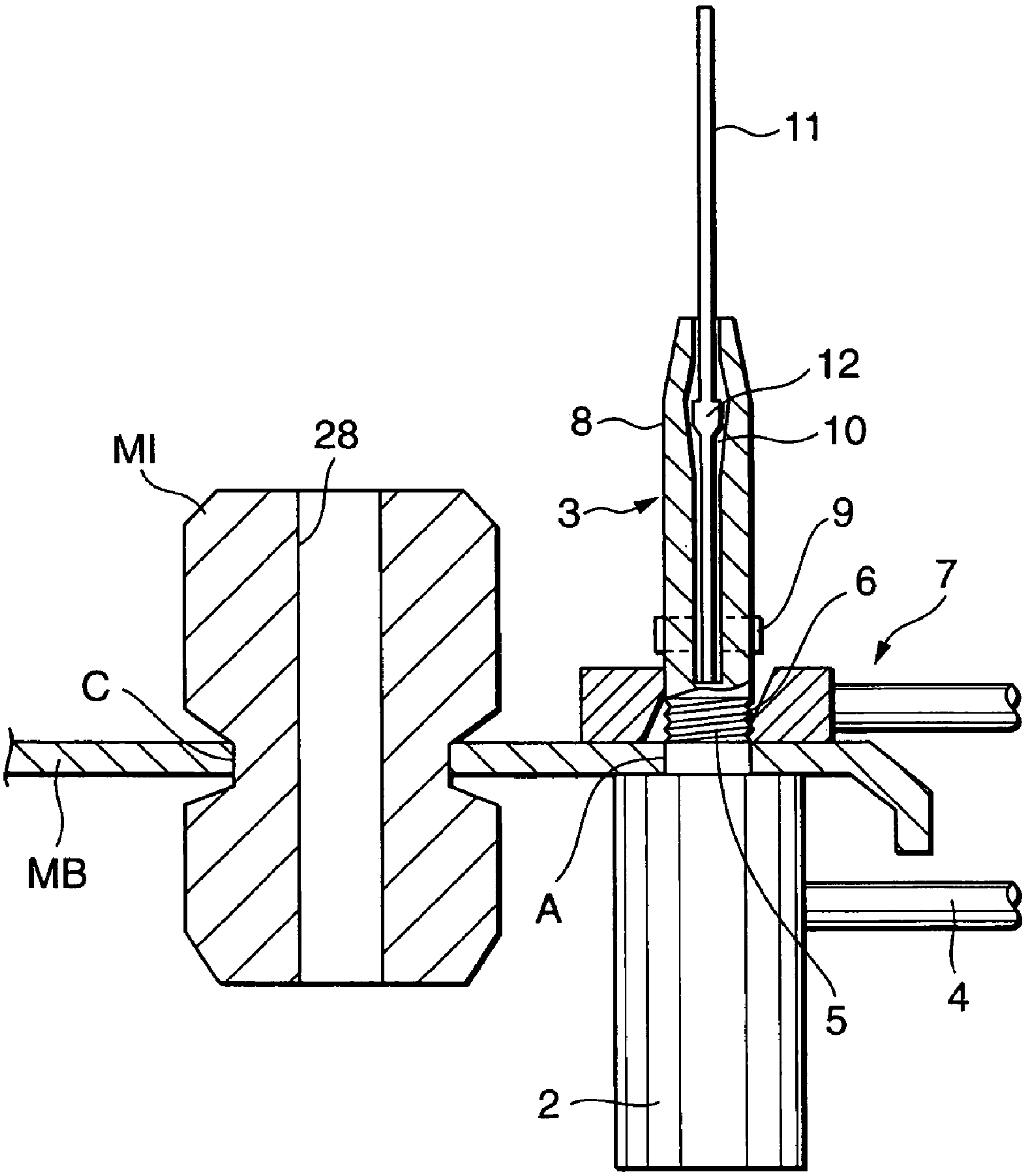
FIG. 2 is a longitudinal sectional view of the locating jig attached to a frame of the vehicle.

Referring to FIG. 2, a similar mount insulator MI to that of the aforementioned prior art example is fixed to the hole C. The locating jig 1 is attached to the hole A. When the body B is to be attached to the frame F, first the locating jig 1 is engaged with the locating hole E in the mounting portion BM such that the mount bracket MB and mounting portion BM are aligned, and then, similarly to the prior art, a fastening bolt G is passed through the mount insulator MI and screwed into the fixing screw hole D.

Figure 3:
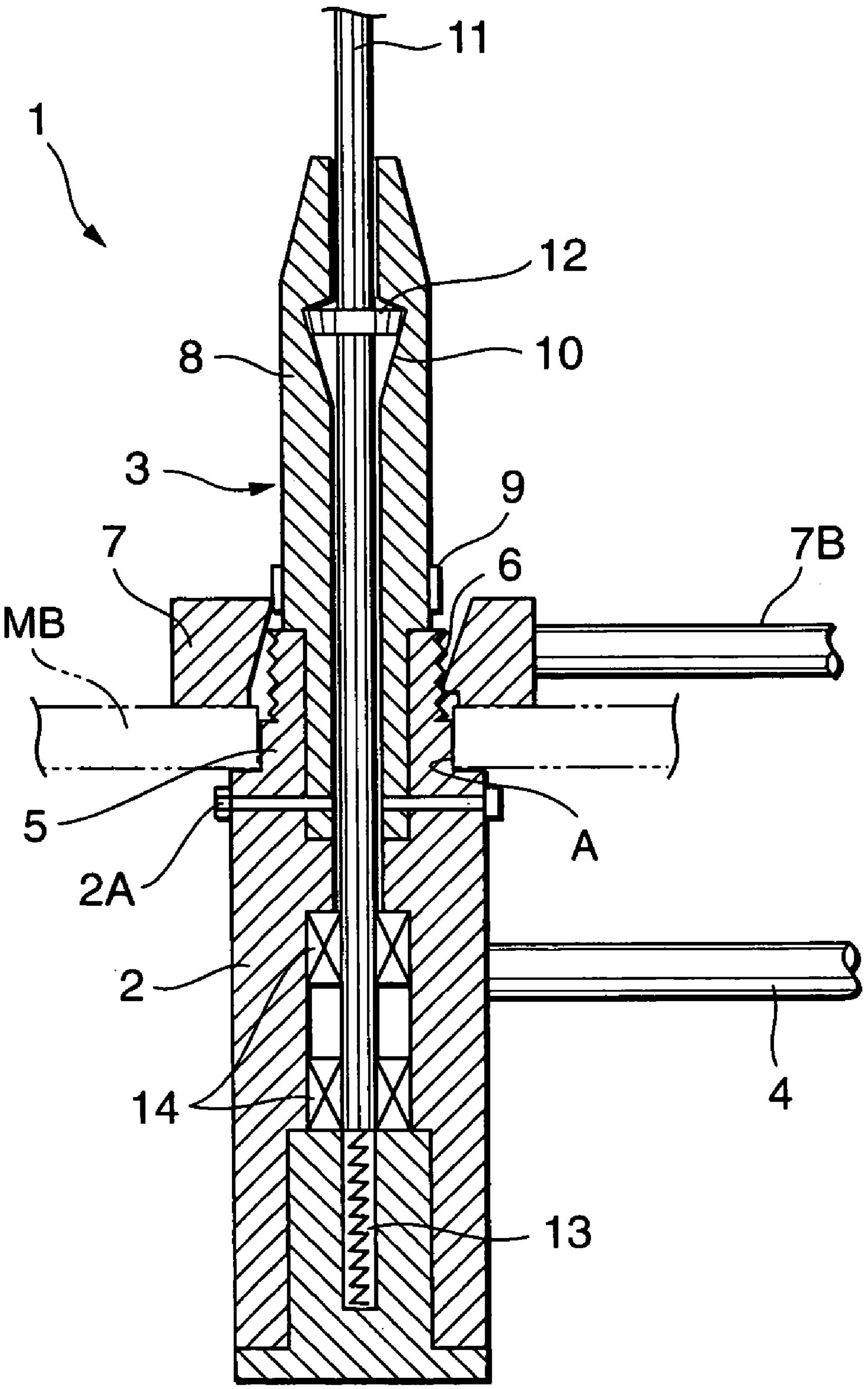
FIG. 3 is a detailed longitudinal sectional view of the locating jig.

Referring to FIG. 3, the locating jig 1 is constituted by a tubular main body portion 2 which is attached to the mount bracket MB, and a locating portion 3 which protrudes upward from the main body portion 2.

A handle 4 is fixed to the main body portion 2. A small diameter portion 5 is formed on the tip end of the main body portion 2. A male screw 6 is formed on the outer periphery of the upper part of the small diameter portion 5. The base end of the locating portion 3 is inserted into a fitting hole formed in the small diameter portion 5, and fixed to the main body portion 2 in advance by a bolt 2A which passes through the main body portion 2 in a transverse direction.

The locating jig 1 is attached to the mount bracket MB by passing the locating portion 3 and the small diameter portion 5 through the hole A in the mount bracket MB, and then screwing a lock nut 7 into the male screw 6. In this state, the frame F is held between the lock nut 7 and the main body portion 2.

The locating portion 3 is a tubular member constituted by a plurality of components 8 disposed at equal angular intervals. To maintain the tubular form of the locating portion 3, these components 8 are bound by a band 9 in the vicinity of the small diameter portion 5. Here, the outer diameter of the band 9 is set to be slightly smaller than the outer diameter of the male screw 6. A wedged rod 11 is inserted into the inside of the locating portion 3.

The tip end of the wedged rod 11 protrudes upwards from the locating portion 3. The base end of the wedged rod 11 passes through the locating portion 3 into the lower main body portion 2, and is supported elastically upward by a coil spring 13 installed in the main body portion 2. A guide 14 which guides the wedged rod 11 in a vertical direction is provided in the main body portion 2. It should be noted that when used in the following description, the expression down corresponds to the vertical direction when the locating jig 1 is in an attached state.

The wedged rod 11 comprises a wedge 12 which protrudes sideward. Accordingly, tapered surfaces 10 for guiding the wedge 12 are formed on the components 8. By means of the tapered surfaces 10, a downward-facing conical space is formed in the inside of the locating portion 3. When the wedged rod 11 is inserted into the main body portion 2 against the urging force of the coil spring 13, the wedge 12 pushes the tapered surfaces 10 outward, thus attempting to expand the diameter of the locating portion 3. The band 9 prevents deformation of the base end of the locating portion 3 against the outward force that is applied to the locating portion 3 by the wedge 12. As a result, the upper end portions of the components 8 that are not bound deform respectively in a radial direction, and thus the diameter of the upper end of the locating portion 3 expands.

Figure 4A:
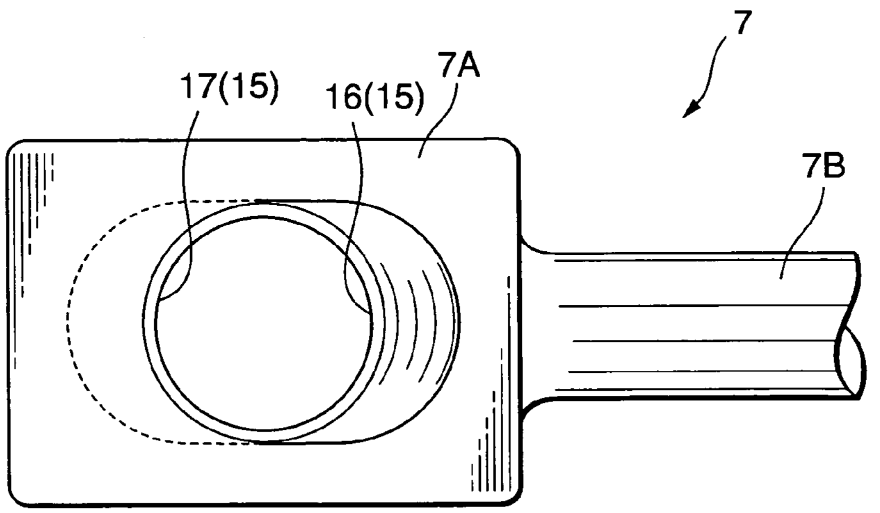
FIGS. 4A-4C are plan views and a longitudinal sectional view of a lock nut according to this invention.
Figure 4B:
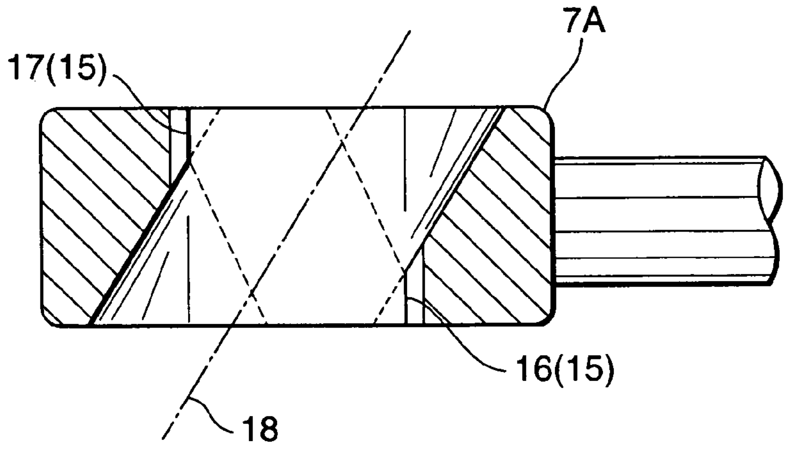

Referring to FIGS. 4A and 4B, to facilitate attachment of the locating jig 1 to the frame F, the lock nut 7 comprises a screw hole 15 having a specific form and a handle 7B which protrudes sideward.

As shown in FIG. 4B, the screw hole 15 passes through the lock nut 7 in an inclined form in the direction of a center line 18. The center line 18 corresponds to a vertical line on an identical vertical plane to the handle 7B which has been rotated in a clockwise direction. Vertical faces 16 and 17 forming a thread are also provided. A thread is also formed continuously across the area shown in FIG. 4B defined between two inclined broken parallel lines that intersect the center line 18.

When the lock nut 7 is fixed to the small diameter portion 5 of the locating jig 1, the inclined screw hole 15 is fitted diagonally downward over the small diameter portion 5 of the locating jig 1 holding the handle 7B, whereupon the handle 7B is rotated downward about the screw hole 15 to become horizontal. As a result, the vertical face 16 forming the thread contacts the male screw 6 of the small diameter portion 5 as shown in FIG. 3. This operation also makes the vertical face 17 contact the band 9. By relatively rotating the handles 4 and 7B in a horizontal direction in this state, the thread of the vertical face 16 screws into the male screw 6 while the vertical face 17 and band 9 strongly interfere with each other. Due to the engagement of the vertical face 16 and the male screw 6 with the interference between the vertical face 17 and band 9, the lock nut 7 is secured onto the small diameter portion 5.

To remove the lock nut 7 from the small diameter portion 5, the handles 4 and 7B are rotated in the opposite directions respectively to the case of fastening to loosen the fastening between the male screw 6 and the vertical face 16, whereupon the handle 7B is rotated upward about the screw hole 15. When the center line 18 is substantially aligned with the central line of the small diameter portion 5, the entire locating jig 1 is pulled away downward.

Figure 4C:
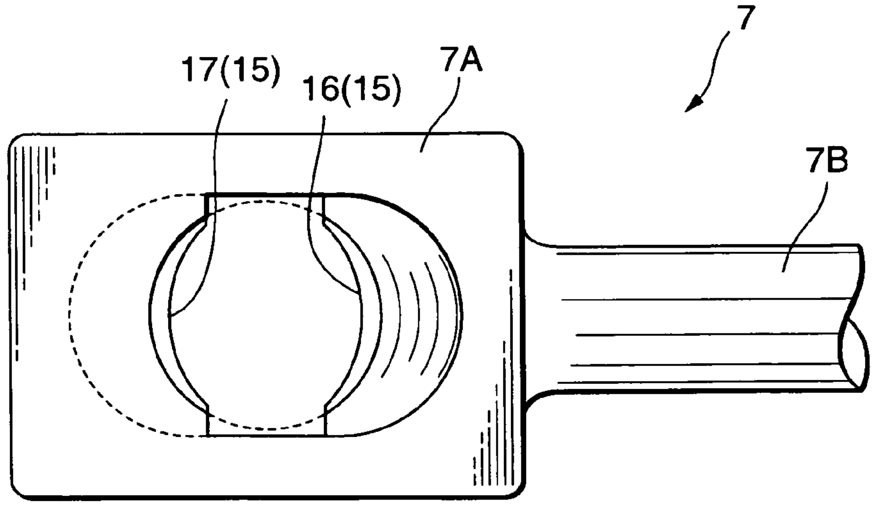

According to this embodiment, a thread is formed on the entire circumference of the screw hole 15. As a result, when the lock nut 7 is fitted onto the smaller diameter portion 5 by rotating the handle 7B downward, the male screw 6 and a part of the thread of the screw hole 15 interfere with each other to prevent the rock nut 17 from deeply engaging with the male screw 6. If the width of the screw hole 15, in other words, the vertical dimension of the screw hole 15 in FIG. 4C, is set sufficiently larger than the outer diameter of the male screw 6, and the thread is formed only on the vertical faces 16 and 17 as shown in the figure, both of the vertical faces 16 and 17 can engage with the male screw 6 when the handle 7B is rotated downward, and the mail screw 6 advances into the rock nut 7 without interference as the handles 4 and 7B relatively rotates horizontally. With this construction, the locating jig 1 is secured onto the mount bracket MB only by the screw engagement of the rock nut 7 and the mail screw 6 without using reaction force between the vertical face 17 and band 9.

Figure 5:
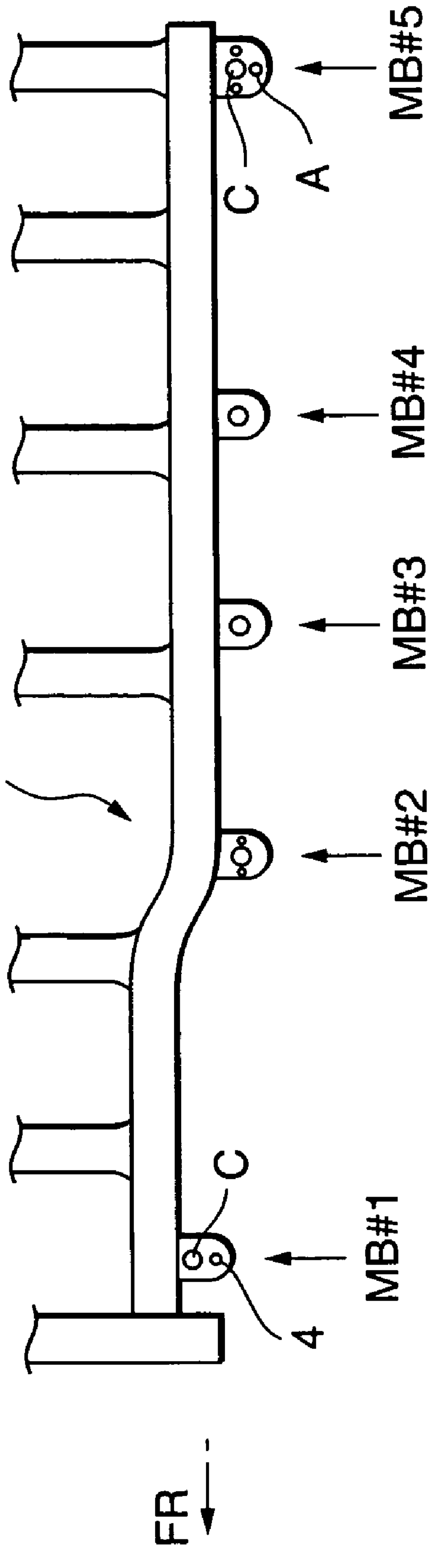
FIG. 5 is a plan view of the main parts of the frame, showing the disposal of mount brackets provided on the frame.

Next, referring to FIG. 5, five mount brackets MB#1-MB#5 are formed on a side face of the frame F. Here, side face is an expression based on the running direction FR of the vehicle. Only one of the side faces of the frame F is illustrated in the drawing. Five mount brackets MB#1-MB#5 .are formed similarly on the opposite side face of the frame F.

Figure 6:
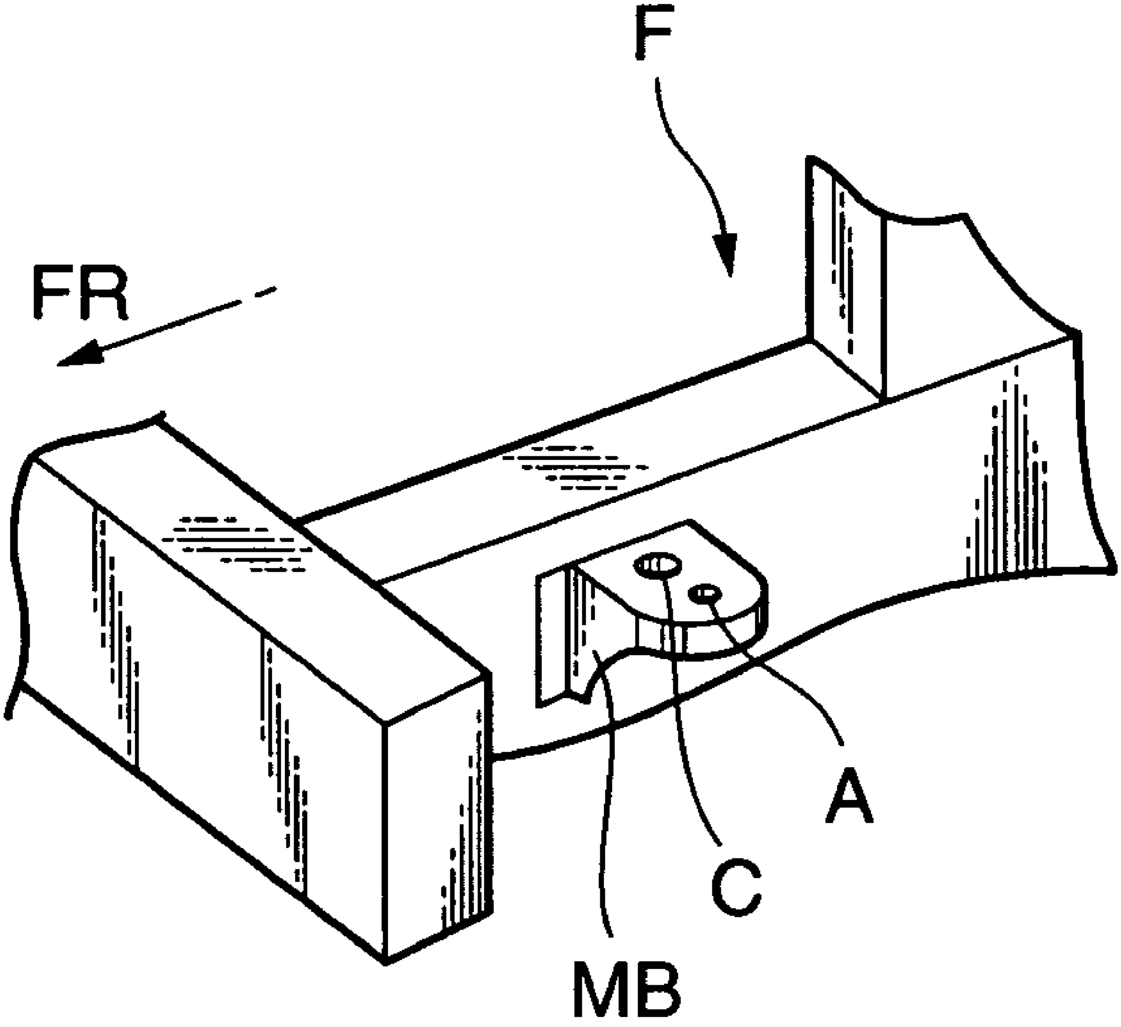
FIG. 6 is a perspective view of a mount bracket.

Referring to FIG. 6, the hole A and the hole C are formed in each of the mount brackets MB#1-MB#5.

Figure 7:
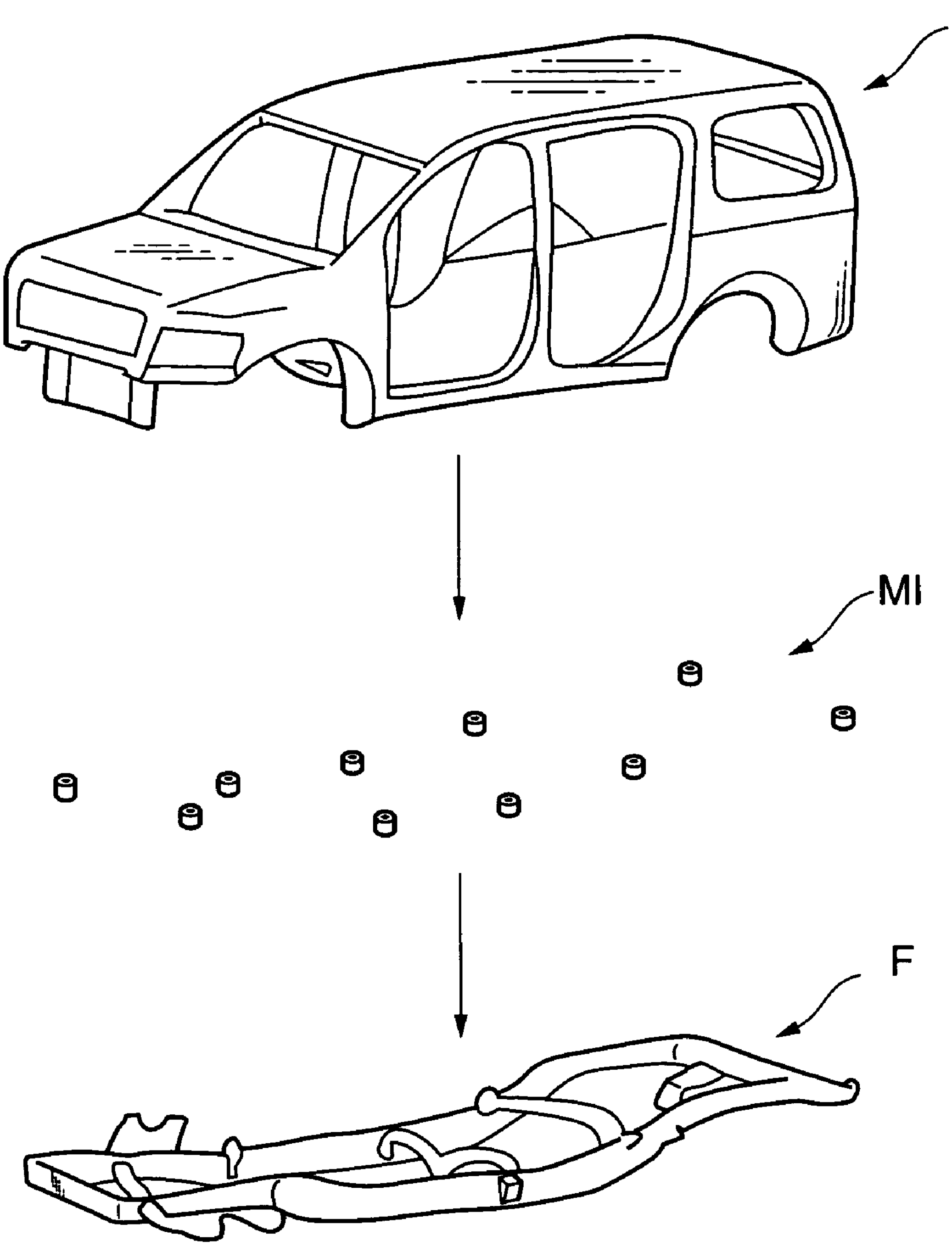
FIG. 7 is a perspective view of the frame and a vehicle body, showing the positional relationship between the frame and body during vehicle assembly.

Referring to FIG. 7, the body B is fixed to the frame F via a total of ten mount insulators MI.

Next, referring to FIGS. 8A and 8B, an operation to align the body B and the frame F using the locating jig 1 attached to the frame F will be described. As described above, this operation is executed to perform accurate alignment of a central hole 28 in the mount insulator MI and the fixing screw hole D before fixing the body B to the frame F using the mount insulator MI, fixing screw hole D, and fastening bolt G.

It is assumed that the mount insulator MI and locating jig 1 are attached in advance to all of the mount brackets MB on the frame F. In this state, as shown in FIG. 6, the body B is lowered toward the frame F from above. The body B is lowered while adjusting the position thereof in the horizontal direction, and thus the tip end of the wedged rod 11 of the corresponding locating jig 1 is caused to penetrate the locating hole E formed in the mounting portion BM of the body B. At this stage, the body B is merely suspended over the frame F and does not contact the frame F. Hence when force is applied to the body B in a horizontal direction, the body B moves easily in the direction in which force is applied. The wedged rods 11 of the ten locating jigs 1 are all inserted into the locating holes E while adjusting the horizontal position of the body B in this manner.

Figure 8A:
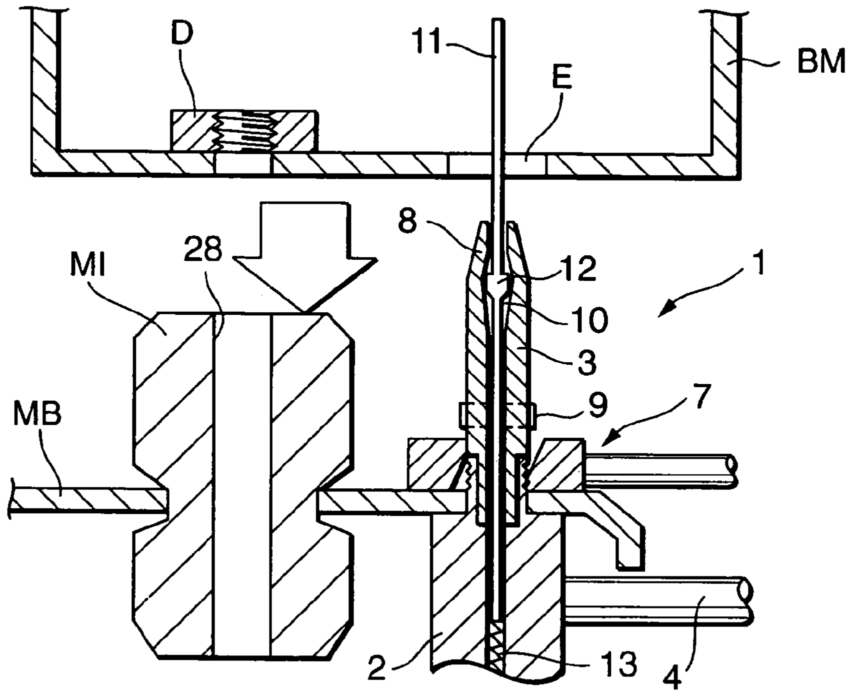
FIGS. 8A and 8B are transverse sectional views of an engaging portion between the frame and body, illustrating an operation to engage the locating jig with the body.
Figure 8B:
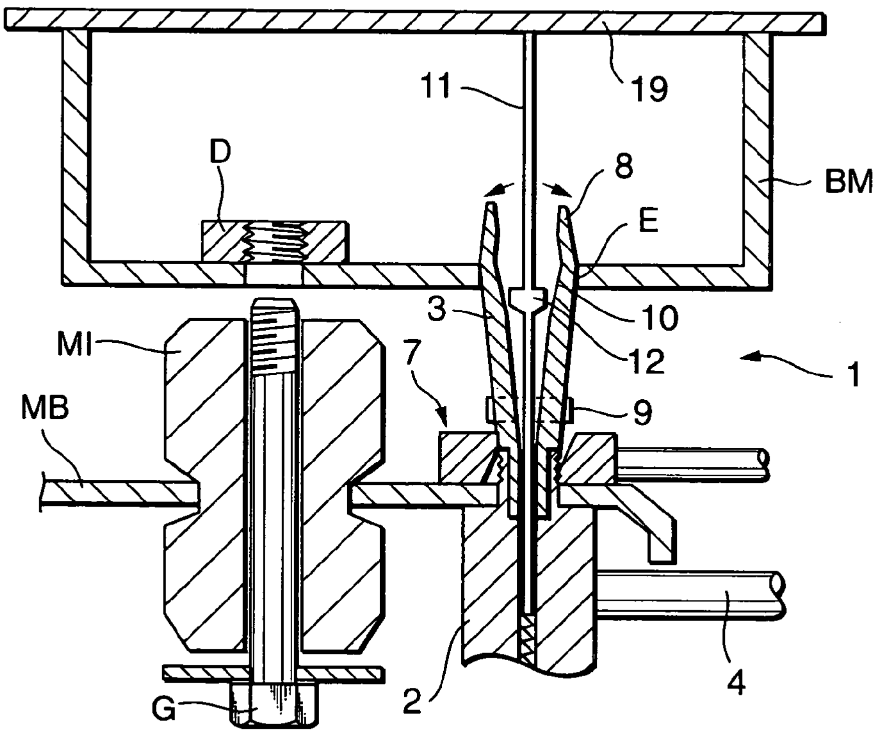

Once all of the wedges rods 11 have been inserted into the locating holes E as shown in FIG. 8A, the body B is lowered further. As a result, the upper end of the locating portion 3 penetrates the locating hole E, and furthermore, the upper end of the wedged rod 11 impinges on the top plate 19 of the mounting portion BM which covers the locating hole E from above. As the body B is lowered further, the wedged rod 11 that is pressed against the top plate 19 forces its base end to penetrate deeper into the interior of the locating jig 1 against the urging force of the coil spring 13 while the components 8 are pushed open by the wedge 12 as shown in FIG. 8B. Since expansion in the diameter of the base end of the locating portion 3 is restricted by the band 9, this operation causes the diameter of the upper portion of the locating portion 3 to expand.

The locating portion 3 which expands in diameter eventually contacts the inner periphery of the locating hole E. By adjusting the horizontal position of the body B in accordance with this state of contact, all of the locating portions 3 are fitted perfectly into the respective locating holes E without gaps.

The diameter of the locating portion 3 after expansion corresponds to the claimed first diameter, whereas the diameter of the locating portion 3 before expansion corresponds to the claimed second diameter.

By aligning the body B with the frame F in this manner, the central hole 28 of the mount insulator MI positioned in the vicinity of each locating jig 1 is automatically adjusted to a concentric position with the fixing screw hole D in the mounting portion BM of the body B.

In this state, the bolt G is inserted into the central hole 28 and screwed into the fixing screw hole D, thereby fixing the body B to the frame F. Once alignment of the body B to the frame F is complete, a fixing operation using the bolt G is performed, and hence no load in an eccentric direction is applied to the mount insulator MI during the tightening process of the bolt G. It should be noted that the orientation of the bolt G may be set in reverse such that the bolt G is fixed downward into the mounting portion BM of the body B. In this case, the bolt G is passed through the central hole 28 in the mount insulator MI from above while aligning the body B with the frame F in the manner described above, and then a nut is tightened onto the penetration end.

Once fixing of the body B to the frame F using the mount insulator MI, fixing screw hole D, and fastening bolt G in the manner described above is complete, the locating jigs 1 positioned in the vicinity of the respective mount insulators MI are removed.

To remove the locating jigs 1, first the handles 4 and 7B are relatively rotated horizontally to loosen the fastening between the male screw 6 of the locating jig 1 and the vertical face 16 of the lock nut 7.

Next, the handle 7B is lifted upward, and the hole 15 is rotated relative to the male screw 6 until the center line 18 is substantially aligned with the central axis of the small diameter portion 5.

In this state, the entire locating jig 1 is pulled away downward. As the locating jig 1 moves downward, the wedged rod 11 that is urged by the coil spring 13 protrudes upward from the locating portion 3 such that the wedge 12 is displaced upward relative to the tapered surfaces 10. As a result, the pushed-open components 8 return to their original state, and the diameter of the locating portion 3 on the inside of the locating hole E contracts. Thus the locating jig 1 can be removed from the locating hole E in the mounting portion BM and the hole A in the mount bracket MB without resistance.

Once removed, the locating jig 1 can be reused in the assembly of another vehicle.

By using the locating jig 1 in this manner, alignment of the body B to the frame F can be performed easily. Further, once the vehicle body B has been fixed to the frame F, the locating jig 1 can be removed easily, and hence the locating jig 1 can be used recurrently as many times as is required.

Next, referring to FIGS. 9 and 10, a second embodiment of this invention, relating to a locating jig, will be described.

Figure 9:
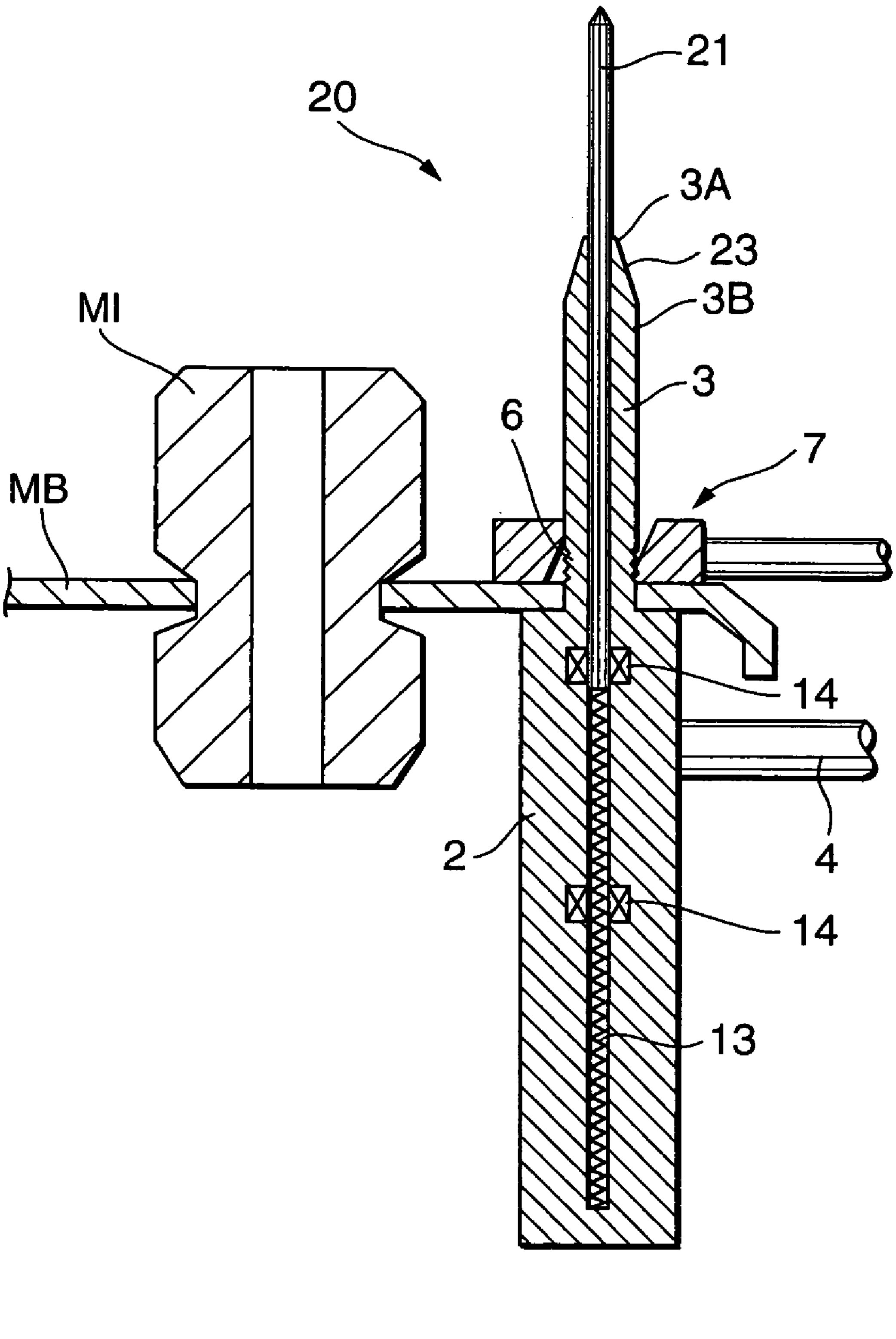
FIG. 9 is a longitudinal sectional view of a locating jig according to a second embodiment of this invention.

In this embodiment, a locating jig 20 shown in FIG. 9 is used in place of the locating jig 1 of the first embodiment.

The locating jig 20 is constituted such that instead of expanding the diameter of the upper portion of the locating portion 3 using the wedge 12, a tapered portion 23 is used to secure concentricity between the locating hole E and the locating portion 3. The locating portion 3 is formed integrally with the small diameter portion 5, and comprises a simple tubular intermediate portion 3B having a substantially identical diameter to that of the locating hole E, and the tapered portion 23 which extends upward from the intermediate portion 3B and has a gradually contracting diameter. The diameter of the intermediate portion 3B corresponds to the claimed first diameter, and the diameter of an upper end portion 3A of the locating portion 3, or in other words the diameter of the upper end of the tapered portion 23, corresponds to the claimed second diameter.

The locating jig 20 comprises a straight guide rod 21 instead of the wedged rod 11. Other constitutions of the locating jig 20 are identical to those of the locating jig 1 of the first embodiment. The fixing constitution of the locating jig 20 to the frame F is also identical to the fixing constitution of the locating jig 1 to the frame F.

Alignment of the body B to the frame F using the locating jig 20 is performed as follows.

Figure 10:
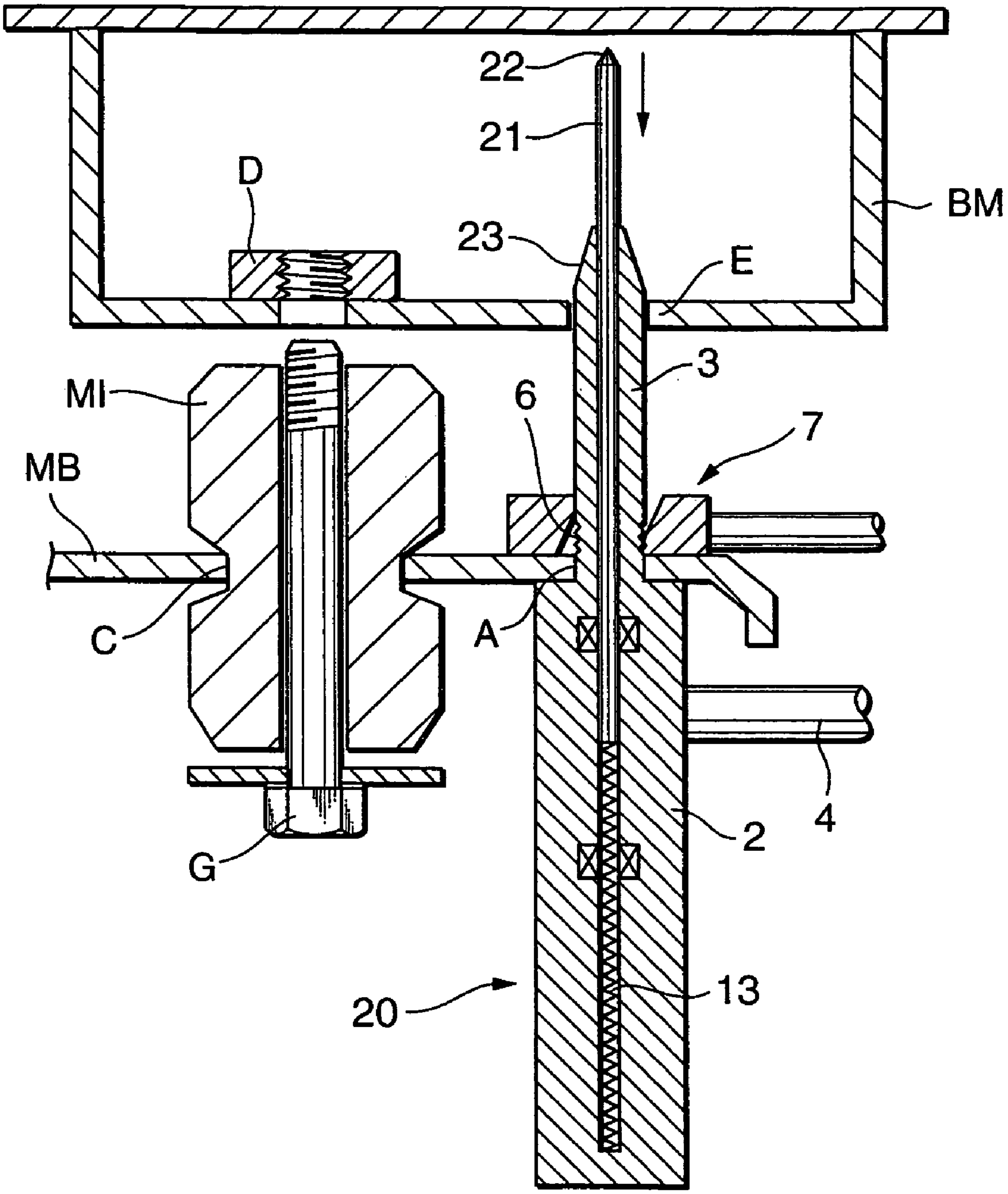
FIG. 10 is a transverse sectional view of an engaging portion between a frame and a vehicle body, illustrating an operation to engage the locating jig according to the second embodiment of this invention.

As shown in FIG. 10, the body B is lowered from above toward the locating jig 20, which is attached to the frame F by the lock nut 7, such that first, the guide rod 21 is inserted into the locating hole E in the mounting portion BM. When the guide rods 21 have been inserted into all of the locating holes E, rough alignment of the body B with the frame F is complete. Next, the body B is lowered further such that the tapered portion 23 penetrates the locating hole E. At this time, insertion of the tapered portion 23 into the locating hole E is aided by making slight adjustments to the horizontal position of the body B. When the main body of the locating portion 3 has been inserted into the locating hole E following the insertion of the tapered portion 23, alignment of the body B with the frame F is complete. The following operations are identical to those of the first embodiment.

The guide rod 21 contracts when it impinges on the top plate 19. In this embodiment, the mounting portion BM of the body B is formed identically to that of the first embodiment, but in cases where the top plate 19 is not provided on the mounting portion BM, the guide rod 21 may be fixed to the locating portion 3 in a non-contracting form.

If the guide rod 21 is lengthened, rough alignment of the body B and frame F may be performed when the body B and frame F are removed from one another. By lengthening the guide rod 21, however, the guide rod 21 may interfere with the top plate 19 or another part of the body B when the body B is lowered further. By constructing the guide rod 21 in a contracting form, such interference can be avoided.

Next, referring to FIG. 11 through FIGS. 18A, 18B, a third embodiment of this invention, relating to a locating jig, will be described.

In this embodiment, a locating jig 30 is used in place of the locating jig 1 of the first embodiment. The main difference between the locating jig 30 and the locating jig 1 is that with the locating jig 30, the lock nut 7 is not used during attachment to the frame F, and the diameter of the locating portion 3 is caused to expand at an intermediate portion of the locating portion 3.

Figure 11:
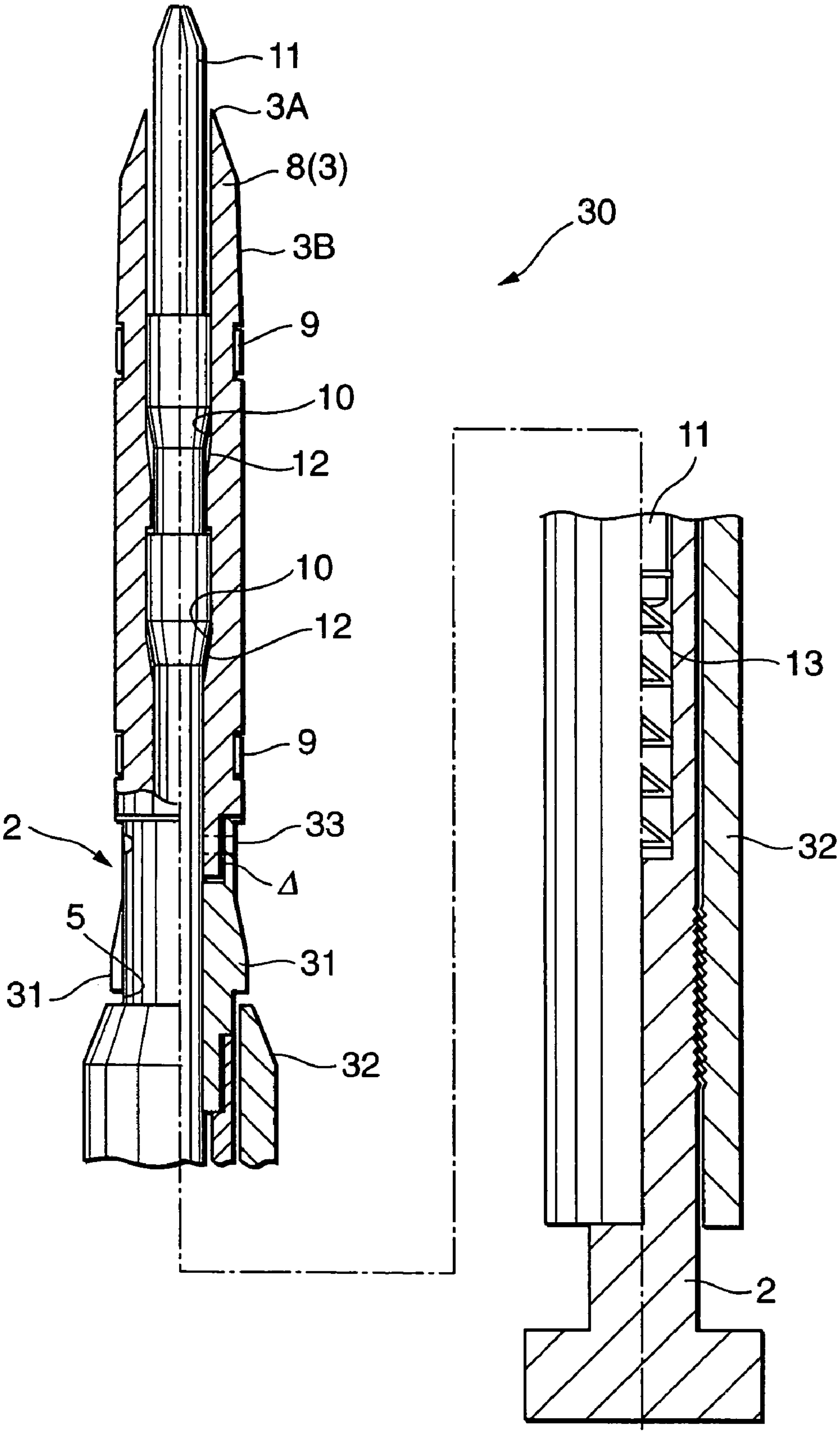
FIG. 11 is a longitudinal sectional view of the main parts of a locating jig according to a third embodiment of this invention.

Referring to FIG. 11, the locating jig 30 comprises a pair of protrusions 31 protruding in a radial direction at intervals of 180 degrees in the vicinity of the upper end of the main body portion 2, or in other words the boundary with the locating portion 3. An outer tube 32 is screwed onto the outer periphery of the main body portion 2 below the protrusions 31.

The components 8 constituting the locating portion 3 are bound respectively by bands 9 in two locations near the base end and tip end of the locating portion 3. The base end of the components 8 is inserted into a recess formed in the upper end of the main body portion 2. Further, a pin 33 is passed through the main body portion 2 and the base end of the components 8 in a transverse sectional direction such that the components 8 are latched to the main body portion 2. To allow a slight expansion in the outer diameter of the components 8, a slight gap D is set between the components 8 and the concave portion. This gap D allows a slight displacement of the lower end of the components 8 in a radial direction.

The wedged rod 11 comprises two wedges 12 which are constituted so as to expand the diameter at sites positioned between the two bands 9. Tapered surfaces 10 are formed on the components 8 corresponding to each of the wedges 12. Similarly to the first embodiment, the tapered surfaces 10 form a downward-facing conical space inside the locating portion 3. Also similarly to the first embodiment, the wedged rod 11 is supported elastically upward by the coil spring 13 installed inside the main body portion 2.

Figure 12A:
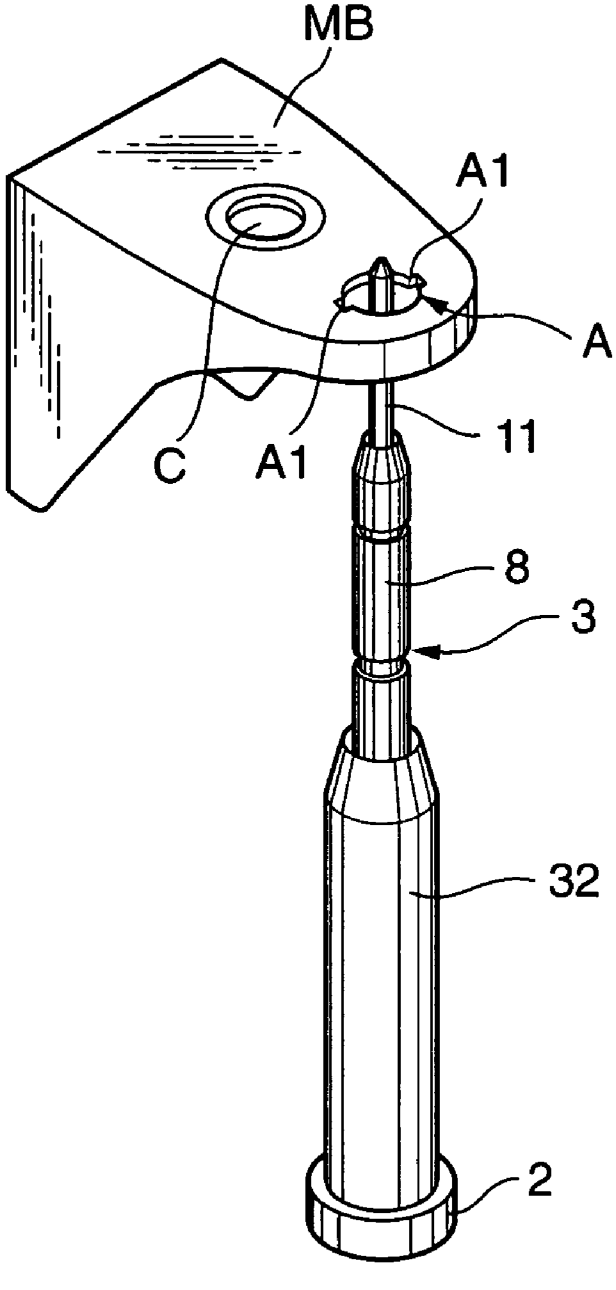
FIGS. 12A and 12B are a perspective view of the main parts involved in an initial operation to attach the locating jig to a frame, and a plan view of a jig attachment hole in the frame, according to the third embodiment of this invention
Figure 12B:
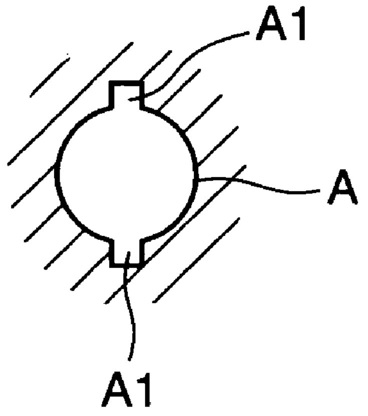

Referring to FIGS. 12A and 12B, notches A1 through which the protrusions 31 can pass are formed at intervals of 180 degrees in the hole A formed in the mount bracket MB of the frame F. The hole A has a slightly larger diameter than the small diameter portion 5, and the diameter of all of the members of the locating portion 3, excluding the protrusions 31, is set to be smaller than that of the hole A.

The locating jig 30 is fixed to the frame F by the following method before the body B is lowered.

First, as shown in FIG. 12A, the tip end of the wedged rod 11 of the locating jig 30 is inserted into the hole A in the mount bracket MB from below the frame F. The entire locating portion 3 is then inserted into the hole A while holding the locating jig 30 such that the protrusions 31 move into angular positions corresponding to the notches A1.

Figure 13B:
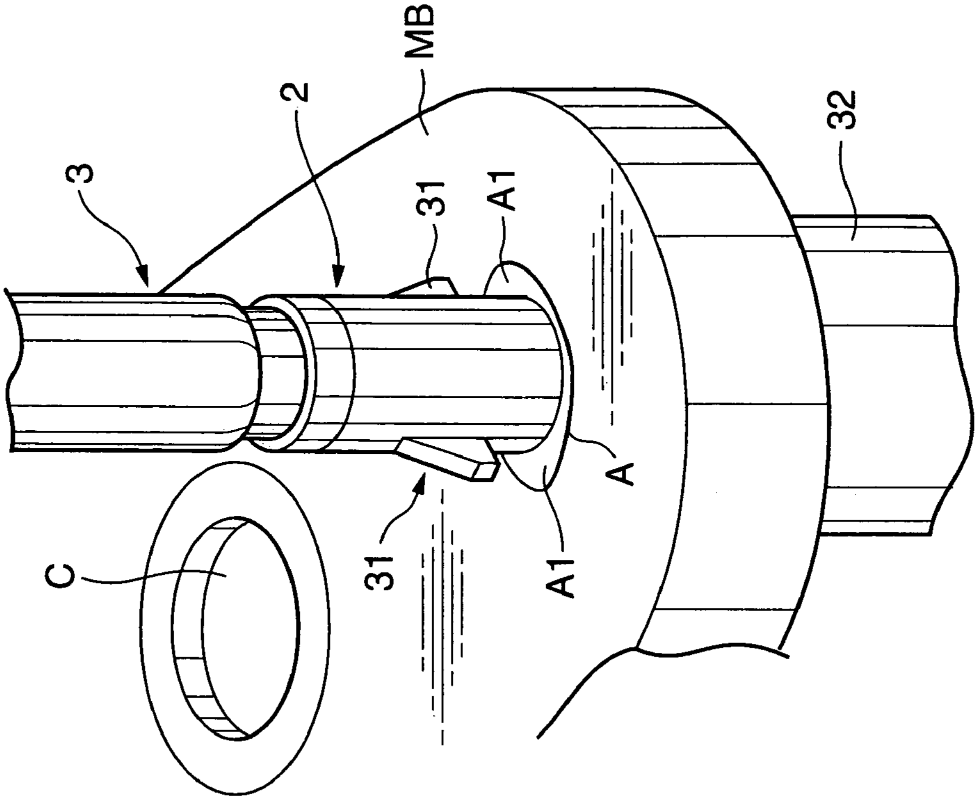
FIGS. 13A and 13B are a perspective view and an enlarged perspective view of the main parts involved in the next stage of the operation to attach the locating jig to the frame, according to the third embodiment of this invention.
Figure 13A:
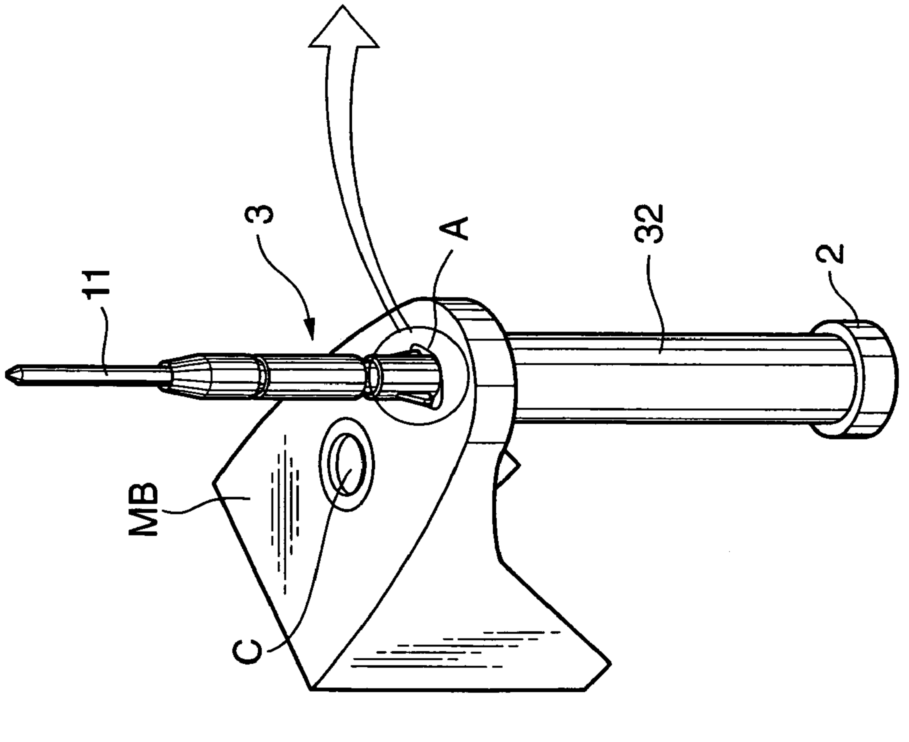
Figure 14B:
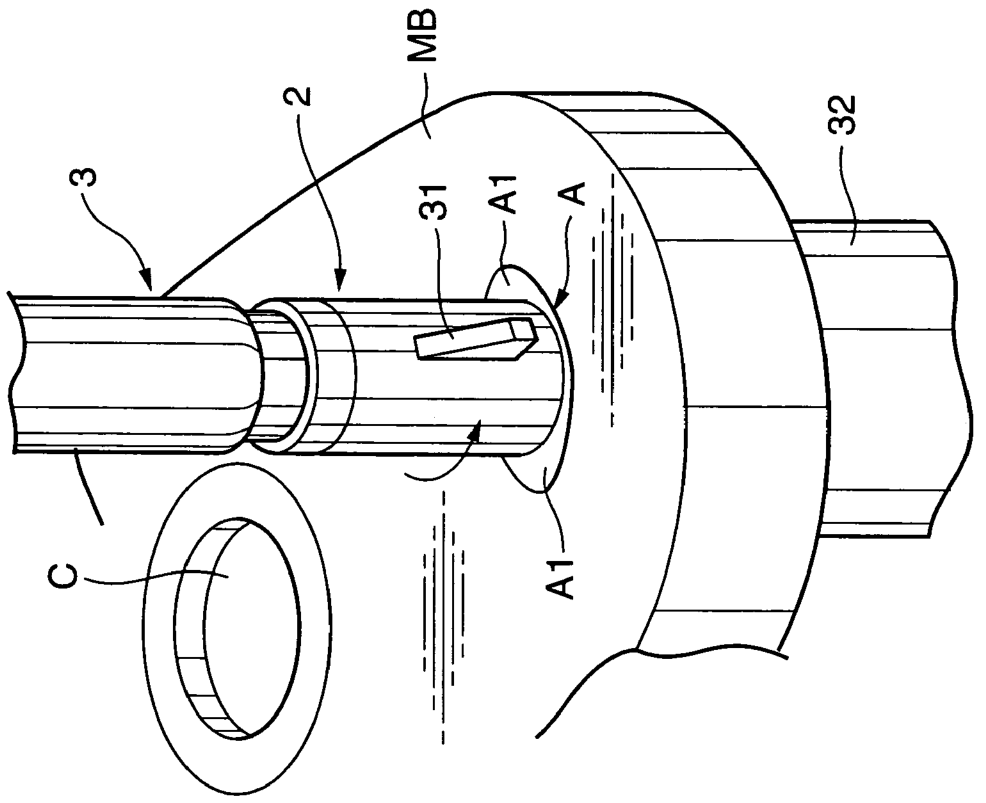
FIGS. 14A and 14B are similar to FIGS. 13A and 13B, but show the next stage of the operation.
Figure 14A:
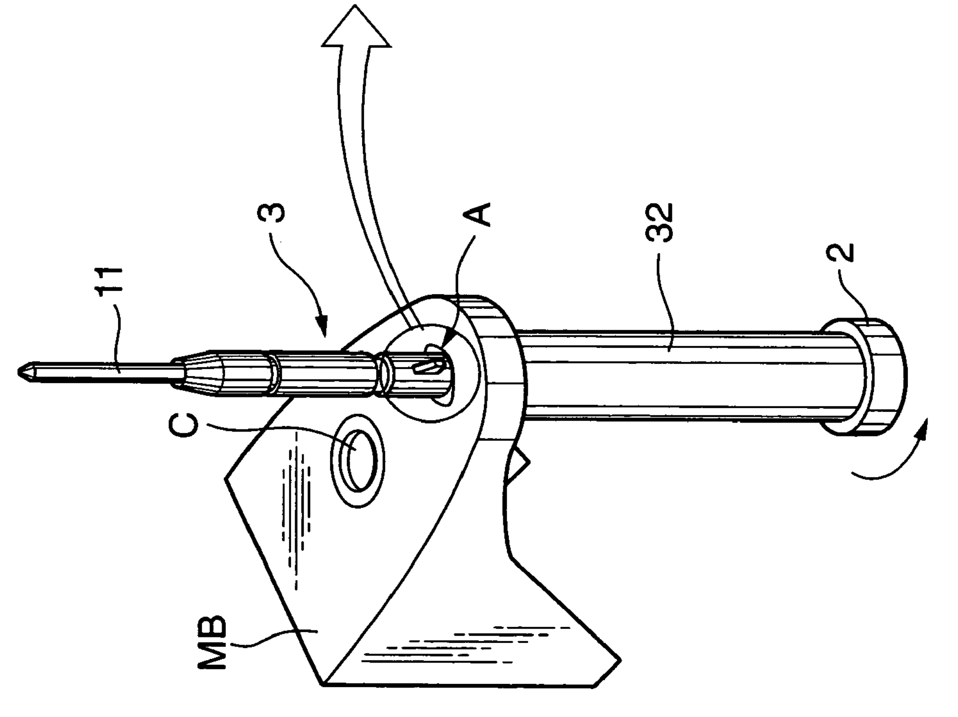

Once the protrusions 31 have been passed through the notches A1 and pulled out above the hole A, as shown in FIGS. 13A and 13B, the locating jig 30 is rotated approximately ninety degrees, as shown in FIGS. 14A and 14B.

Figures 15A, 15B:
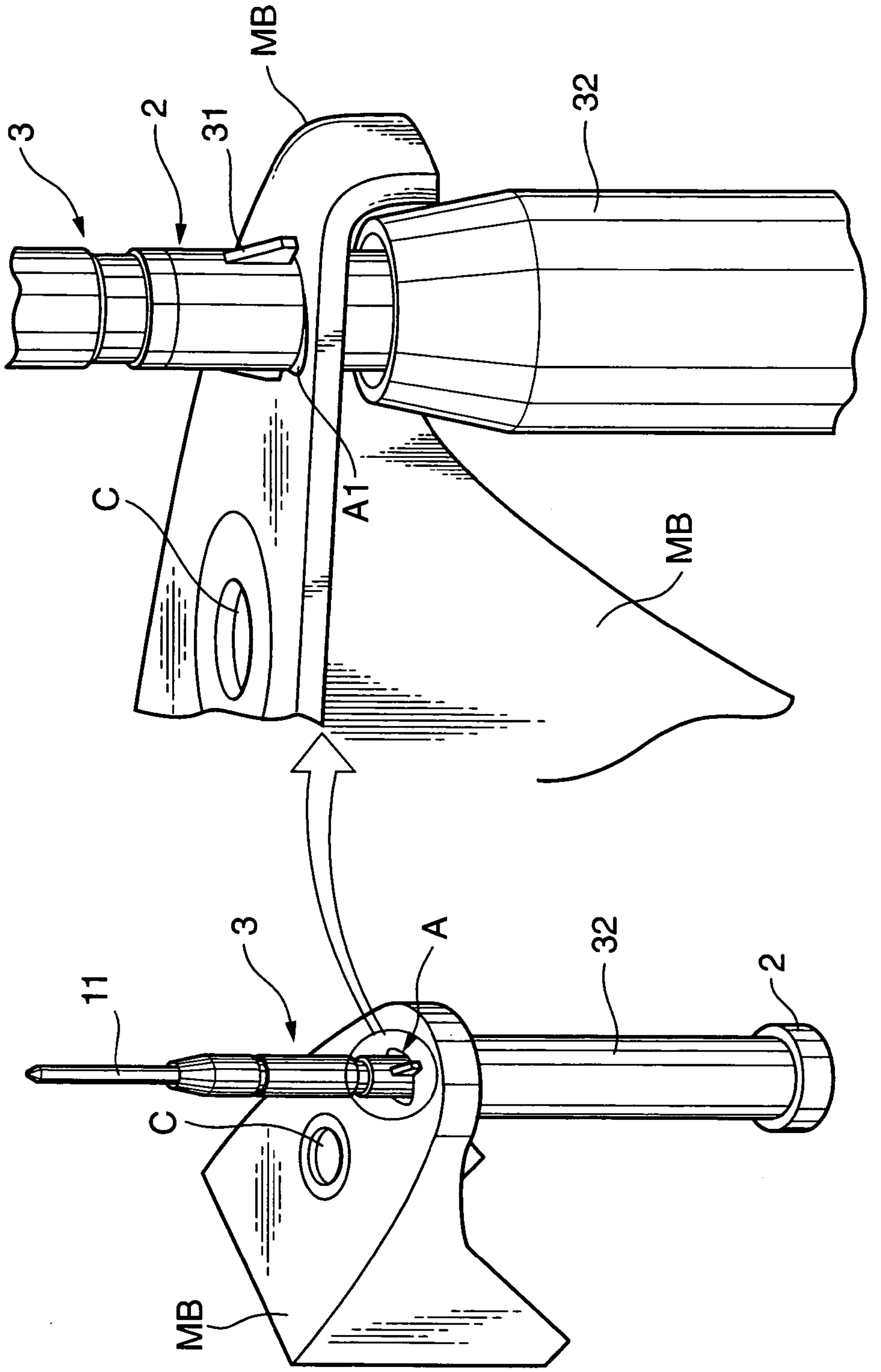
FIGS. 15A and 15B are similar to FIGS. 14A and 14B, but show the next stage of the operation.
Figure 16:
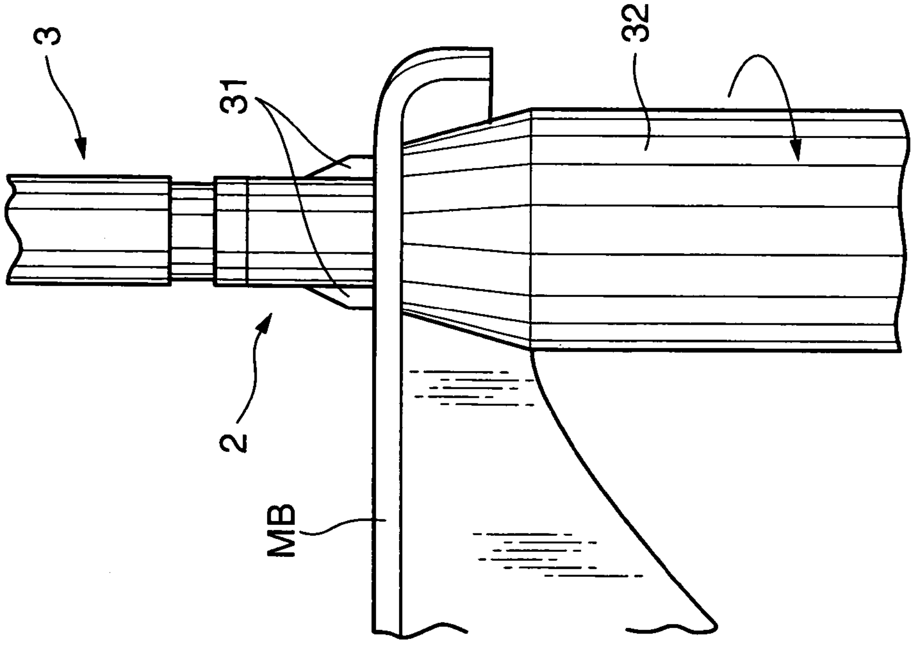
FIG. 16 is a side view of the main parts of the locating jig and frame according to the third embodiment of this invention, showing a state in which attachment of the locating jig is complete.

In this state, the protrusions 31 are engaged with the outer edge of the hole A as shown in FIGS. 15A and 15B, whereupon the outer tube 32 is operated to rotate in a predetermined direction while holding the main body portion 2 as is. The outer tube 32, which is screwed onto the main body portion 2, is brought into proximity with the mount bracket MB by means of the rotation operation, and thus, as shown in FIG. 16, the mount bracket MB is tightened so as to be held between the protrusions 31 and the tip end of the outer tube 32. By means of this constitution, the locating jig 30 is attached to the mount bracket MB without the use of the lock nut 7.

Once all of the locating jigs 30 have been fixed to the mount brackets MB in this manner, the body B is lowered toward the frame F.

Figure 17:
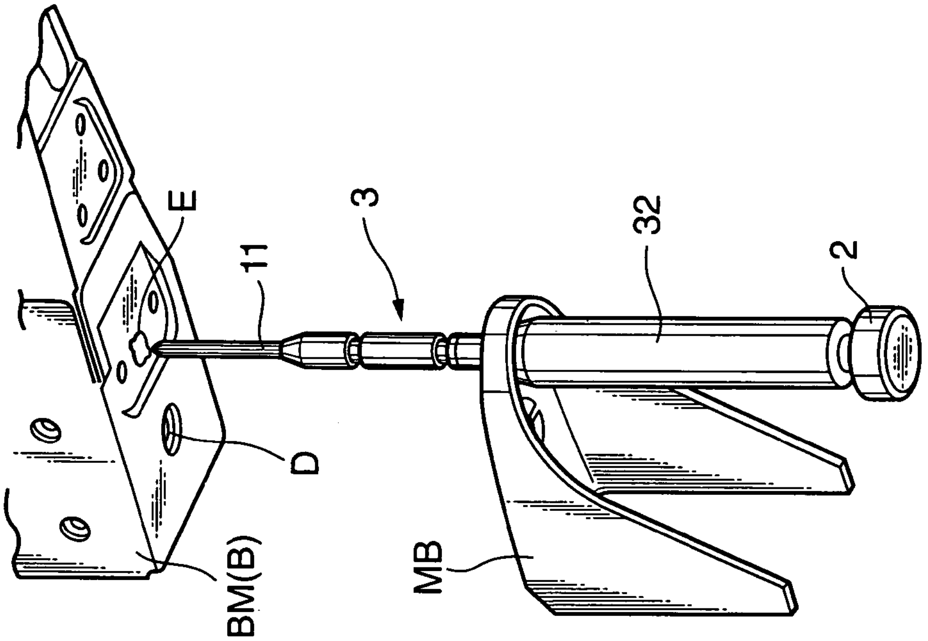
FIG. 17 is a perspective view of an engaging portion, illustrating a process of engaging the locating jig with a vehicle body according to the third embodiment of this invention.

Next, as shown in FIG. 17, the tip end of the wedged rod 11 on each locating jig 30 is inserted into the locating hole E of the corresponding mounting portion BM while performing position adjustment of the body B in the horizontal direction.

Figure 18B:
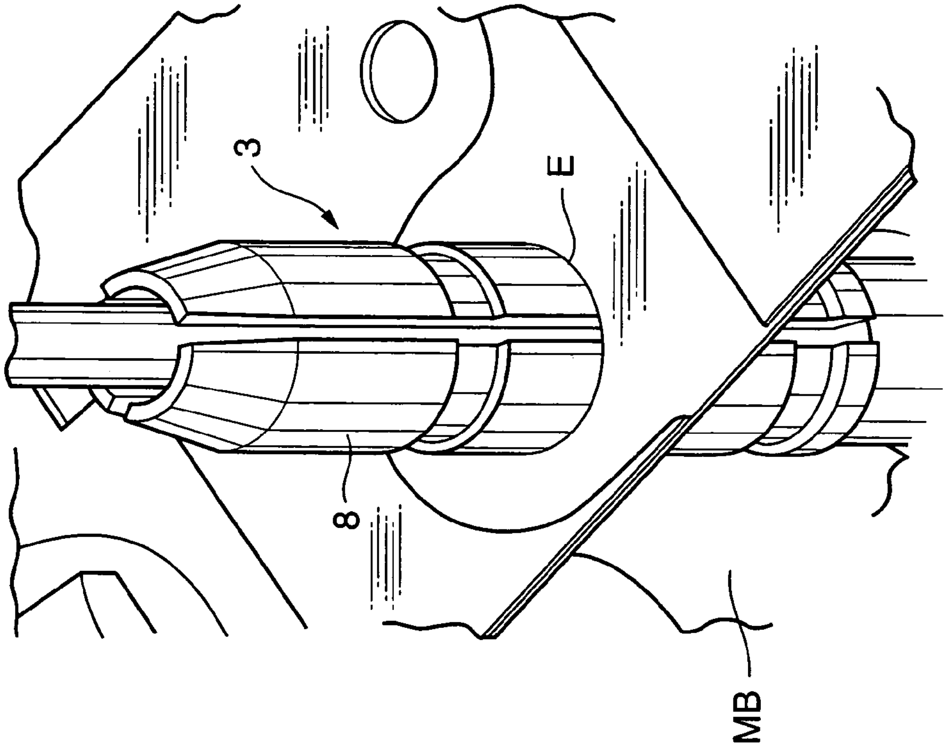
FIGS. 18A and 18B are a side view and a perspective view of the engaging portion, illustrating a further process of engaging the locating jig with the body according to the third embodiment of this invention.
Figure 18A:
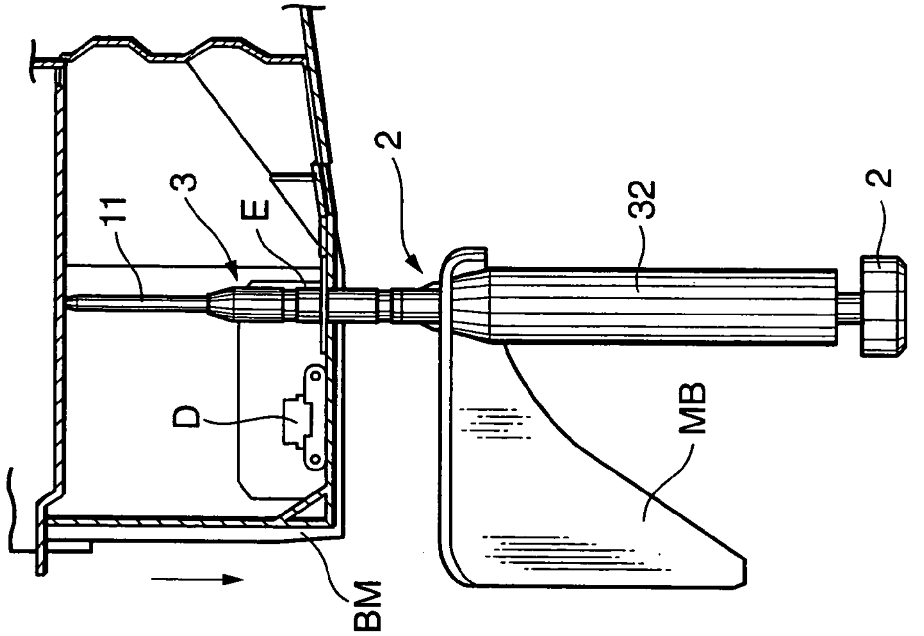

Next, referring to FIG. 18A, when the wedged rod 11, having passed through the hole E, impinges on the top plate 19 of the mounting portion BM, then the wedged rod 11 cannot penetrate the hole E any further. Thereafter, as the locating portion 3 penetrates the hole E, the wedged rod 11 falls back into the locating portion 3 by contracting the coil spring 13. As a result, the two wedges 12 push the tapered surfaces 10 of the components 8 outward.

The components 8 are bound by the bands 9 in two locations, near the top end and near the base end thereof. Hence, due to the penetration of the wedges 12, the diameter of the locating portion 3 expands substantially uniformly between the bands 9.

As its diameter expands, the locating portion 3 eventually contacts the inner periphery of the locating hole E. By adjusting the horizontal position of the body B in accordance with this state of contact, all of the locating portions 3 are fitted perfectly into the respective locating holes E without gaps.

The diameter of the locating portion 3 in its expanded state corresponds to the claimed first diameter, and the diameter of the locating portion 3 prior to expansion corresponds to the claimed second diameter.

By aligning the body B with the frame F in this manner, the central hole 28 in the mount insulator MI positioned in the vicinity of each locating jig 30 is automatically adjusted to a concentric position with the fixing screw hole D in the mounting portion BM of the body B. In this state, the fastening bolt G is used similarly to the first embodiment to fix the body B to the frame F.

It should be noted that although the mount insulator MI is not illustrated in the drawings from FIGS. 12A, 12B through FIGS. 18A, 18B, the mount insulator MI is fixed to the hole C prior to attachment of the locating jig 30 to the mount bracket MB.

After fixing the body B to the frame F, the locating jig 30 is removed from the mounting portion BM and mount bracket MB by performing a reverse operation to that performed when attaching the locating jig 30. More specifically, first the outer tube 32 is rotated in relation to the main body portion 2 and thus the outer tube 32 retreats from the mount bracket MB. Once the fastening between the outer tube 32 and the mount bracket MB has been loosened by this operation, the main body portion 2 is rotated to align the protrusions 31 with the notches A1.

By pulling the main body portion 2 downward in this state, the wedged rod 11, which is urged upward by the coil spring 13, protrudes upward from the locating portion 3 such that the wedges 12 pushing the components 8 outward are displaced upward. As a result, the diameter of the locating portion 3 contracts, and thus the locating portion 3 can be removed from the locating hole E easily. At this time, the protrusions 31 move downward through the notches A1.

In this embodiment, similarly to the first embodiment, alignment of the body B to the frame F is performed accurately, and hence the application of a load in an eccentric direction to the mount insulator MI can be prevented during the operation to fix the body B to the frame F via the mount insulator MI.

Further, in this locating jig 30, which does not use the lock nut 7, all of the operations to fix and remove the locating jig 30 to and from the mount bracket MB are performed from below the hole A, and hence no operating space for the lock nut 7 need be secured. The constitution of the locating jig 30 is simpler than that of the locating jig 1 according to the first embodiment. The locating jig 30 is fixed to the mount bracket MB while the mount bracket MB is held between the outer tube 32 and protrusions 31, and hence fixing can be performed with stability in relation to the mount bracket MB. The diameter of the locating portion 3 expands uniformly between the two bands 9, and hence a high degree of precision can be achieved in the alignment of the body B to the frame F with no irregularities in the state of engagement with the hole E.

In this embodiment, the wedges 12 are provided in two locations, and corresponding tapered surfaces are formed in two locations on the components 8. However, the number of wedges 12 and tapered surfaces 10 may be increased.

The contents of Tokugan 2002-144318 with a filing date of May 20, 2002 in Japan and Tokugan 2003-138527 with a filing date of May 16, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in each of the embodiments described above, the mount insulator MI is fixed to the mount bracket MB of the frame F, and the fixing screw hole D is provided in the mounting portion BM of the body B. However, this invention is also applicable to a vehicle in which the mount insulator MI is fixed to the body B, and the fixing screw hole D is provided in the mount bracket MB.

In the above embodiments, the locating jig 1, 20, 30 is fitted to the mount bracket MB at a location adjacent to the mount insulator MI, but it is still possible to dispose the locating jig 1, 20, 30 at a location distant from the mount insulator MI. It is also not indispensable to use the same number of the locating jigs 1, 20, 30 as that of the mount insulators MI.

The embodiments of this invention in which an exclusive property or privilege is claimed are defined as follows:

1. A method of fixing a vehicle body to a vehicle frame, the body having a fixing hole and a locating hole; comprising:

fitting a locating jig which protrudes upward through a jig hole formed in the frame;

lowering the body toward the frame from above;

performing position alignment of the body and the frame in a horizontal direction by causing the locating jig to penetrate the locating hole;

fixing the body to the frame via an insulator using the fixing hole and a corresponding hole formed in the frame upon completion of the position alignment; and removing the locating jig from the frame after fixing the body to the frame.

2. The fixing method as defined in claim 1, wherein the fixing of the body to the frame comprises fixing the body to the frame using a fixing tool comprising a mount insulator which is fixed to the frame, a mounting portion which is formed on the body, the mounting portion comprising a fixing screw hole, and a fastening bolt which passes through the mount insulator and the mounting portion in a vertical direction, and is tightened into the fixing screw hole.

3. The fixing method as defined in claim 2 wherein the frame comprises a mount bracket to which the mount insulator is fixed, the locating jig is attached to the mount bracket, and the locating hole is formed in the mounting portion.

4. The fixing method as defined in claim 1, wherein the position alignment comprises expanding the locating jig after the locating jig penetrates the locating hole such that the locating jig is caused to engage with the locating hole.

5. The fixing method as defined in claim 4, wherein the locating jig comprises a locating portion comprising a plurality of components which are held in a cylindrical form, and a wedged rod which is supported elastically so as to protrude upward from the inside of the locating portion, the wedged rod comprising a wedge which pushes the components outward by means of downward displacement relative to the locating portion, and the position alignment further comprises inserting the locating portion in the locating hole to cause the wedged rod to push the components outward as the wedge rod impinges on the body.

6. The fixing method as defined in claim 5, wherein the wedged rod comprises a plurality of wedges, each component comprises an equal number of tapered surfaces which impinge on the plurality of wedges, and the locating jig comprises two bands which bind the components above and below the plurality of wedges.

7. The fixing method as defined in claim 1, wherein the locating jig comprises a conically tapered portion facing upward, and the position alignment comprises inserting the tapered portion into the locating hole.

* * * * *